(12) United States Patent
Jeong et al.

(10) Patent No.: US 12,264,254 B2
(45) Date of Patent: Apr. 1, 2025

(54) LIQUID METAL-BASED ELECTRODE AND METHOD OF MANUFACTURING THE SAME

(71) Applicant: UNIVERSITY-INDUSTRY COOPERATION GROUP OF KYUNG HEE UNIVERSITY, Yongin-si (KR)

(72) Inventors: Sun Ho Jeong, Yongin-si (KR); Ye Jin Jo, Anyang-si (KR); Suk Jin Hong, Seongnam-si (KR)

(73) Assignee: UNIVERSITY-INDUSTRY COOPERATION GROUP OF KYUNG HEE UNIVERSITY, Yongin-si (KR)

( * ) Notice: Subject to any disclaimer, the term of this patent is extended or adjusted under 35 U.S.C. 154(b) by 121 days.

(21) Appl. No.: 18/333,058

(22) Filed: Jun. 12, 2023

(65) Prior Publication Data
US 2023/0399534 A1    Dec. 14, 2023

(30) Foreign Application Priority Data
Jun. 13, 2022 (KR) .................. 10-2022-0071472

(51) Int. Cl.
| | | |
|---|---|---|
| C09D 11/52 | (2014.01) | |
| C09D 11/037 | (2014.01) | |
| C23C 4/01 | (2016.01) | |
| C23C 4/06 | (2016.01) | |

(Continued)

(52) U.S. Cl.
CPC ............ *C09D 11/52* (2013.01); *C09D 11/037* (2013.01); *C23C 4/01* (2016.01); *C23C 4/06* (2013.01); *C23C 4/123* (2016.01); *C23C 4/18* (2013.01)

(58) Field of Classification Search
CPC ..................................................... C09D 11/52
See application file for complete search history.

(56) References Cited

U.S. PATENT DOCUMENTS

| | | | |
|---|---|---|---|
| 2015/0201504 A1 | 7/2015 | Yaniv et al. | |
| 2023/0159771 A1* | 5/2023 | Kim ...................... | C09D 11/106 252/512 |

FOREIGN PATENT DOCUMENTS

| | | |
|---|---|---|
| KR | 10-2010-0095330 A | 8/2010 |
| KR | 10-2016-0068083 A | 6/2016 |
| KR | 10-2016-0078048 A | 7/2016 |

(Continued)

OTHER PUBLICATIONS

WO2019033834, machine translation, 2019. (Year: 2019).*

(Continued)

*Primary Examiner* — Robert A Vetere
(74) *Attorney, Agent, or Firm* — Sughrue Mion, PLLC

(57) ABSTRACT

The present disclosure relates to a method of manufacturing a liquid metal-based electrode using a light sintering process. The method of manufacturing a liquid metal-based electrode includes a step of preparing a metal nanoparticle solution, a step of adding metal micron particles and a surface modifier to the metal nanoparticle solution to prepare a mixed solution, a step of adding a liquid metal to the mixed solution to prepare a composite ink containing the liquid metal having a surface oxide film formed thereon, a step of forming an electrode by applying the composite ink onto a substrate, and a step of irradiating the electrode with light to destroy the surface oxide film.

12 Claims, 2 Drawing Sheets

(51) Int. Cl.
    *C23C 4/123*      (2016.01)
    *C23C 4/18*       (2006.01)

(56)            References Cited

FOREIGN PATENT DOCUMENTS

KR     10-20200136581  A      12/2020
KR     10-2021-0122945 A      10/2021
KR     10-20220047150  A       4/2022
WO     WO-2019033834  A1 *    2/2019  ............... C09D 1/00

OTHER PUBLICATIONS

Minje Jo, et al., "Micro-Patterning of Liquid Metal on Flexible Substrate Using Laser Induced-Forward Transfer," J. Korean Soc., Precis., Eng., Feb. 2023, vol. 40, No. 2, pp. 157-162 (6 pages total).
Shanliangzi Liu, et al., "Laser Sintering of Liquid Metal Nanoparticles for Scalable Manufacturing of Soft and Flexible Electronics," Applied Materials & Interfaces, 2018, vol. 10, pp. 28232-28241 (10 pages total).
Korean Office Action issued Mar. 29, 2024 in Application No. 10-2022-0071472.

* cited by examiner

[FIG. 1]
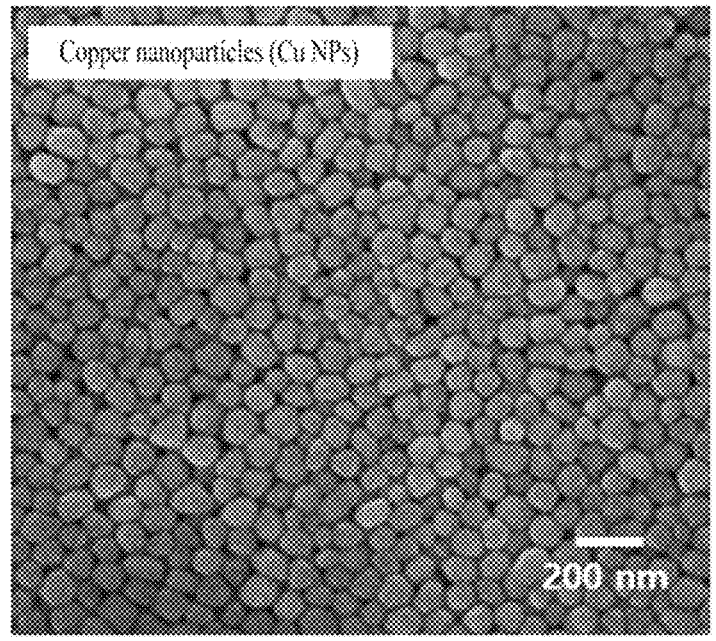
[FIG. 2]
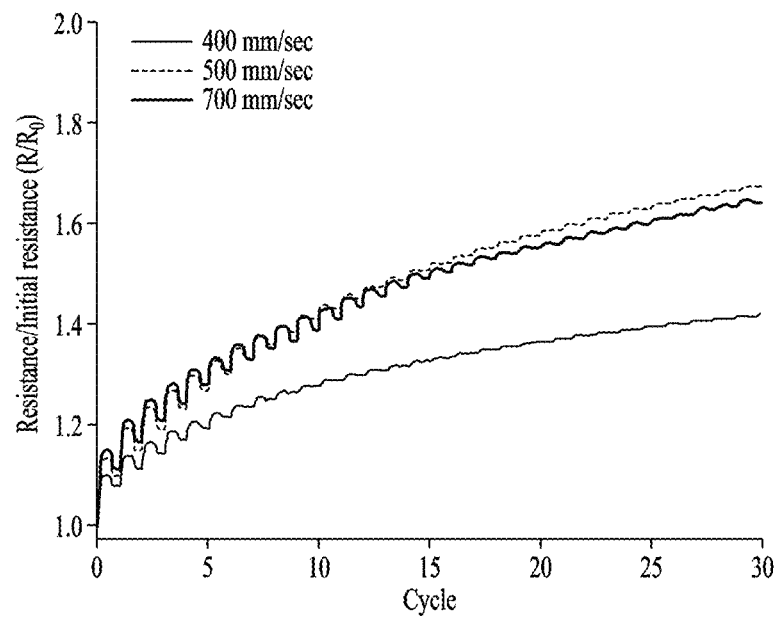

[FIG. 3]
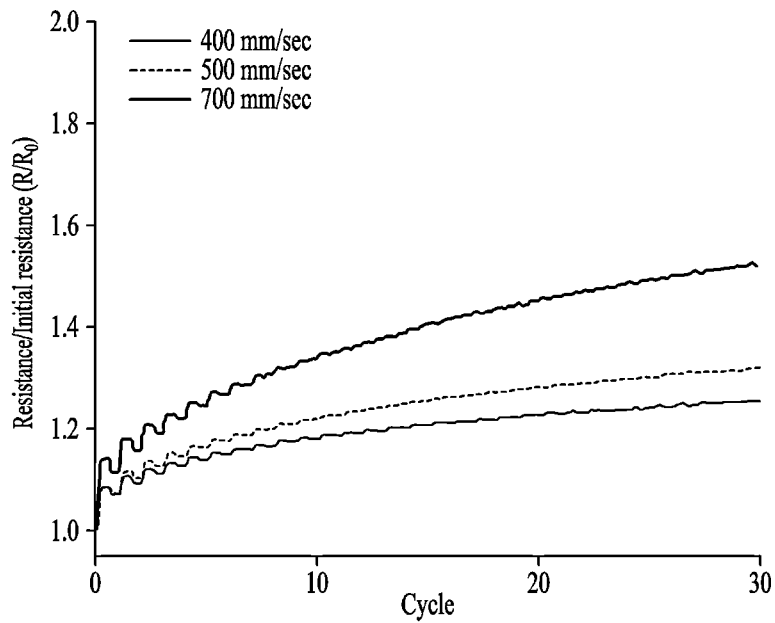
[FIG. 4]
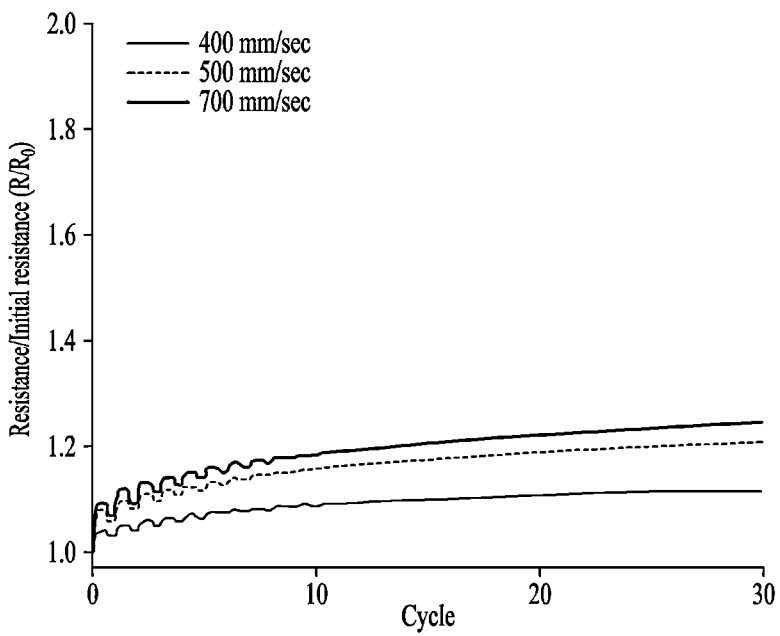

LIQUID METAL-BASED ELECTRODE AND METHOD OF MANUFACTURING THE SAME

CROSS-REFERENCE TO RELATED APPLICATION

This application claims priority to Korean Patent Application No. 10-2022-0071472, filed on Jun. 13, 2022, in the Korean Intellectual Property Office, the disclosure of which is incorporated herein by reference.

BACKGROUND OF THE DISCLOSURE

Field of the Disclosure

The present disclosure relates to a liquid metal-based electrode and a method of manufacturing the same.

Description of the Related Art

Wearable devices and flexible devices are attracting attention as next-generation electronic devices. Liquid metals containing gallium enable realization of flexible/stretchable electrodes due to high conductivity and liquid properties thereof. However, liquid metals have a limitation in that coating and printing processes cannot be performed due to high surface tension thereof. To solve this problem, the surface tension of a liquid metal may be reduced by forming a surface oxide film on the liquid metal. In this case, the liquid metal may be used as an ink for coating and printing processes. However, the liquid metal ink prepared in this way has a fundamental limitation in that conductivity cannot be secured due to the surface oxide film.

RELATED ART DOCUMENTS

Patent Documents

Korean Patent Application Publication No. 10-2016-0068083, "INKJET PRINTER CARTRIDGE AND INKJET PRINTER SYSTEM THAT SPRAY LIQUID METAL"

SUMMARY OF THE DISCLOSURE

Therefore, the present disclosure has been made in view of the above problems, and it is an object of the present disclosure to provide a liquid metal-based composite ink containing metal nanoparticles having a high light energy absorption rate to remove the surface oxide film of a liquid metal.

It is another object of the present disclosure to secure high conductivity by manufacturing an electrode using a composite ink containing a liquid metal and metal micron particles.

It is yet another object of the present disclosure to implement a flexible/stretchable electrode by manufacturing an electrode having a liquid metal-based metal pattern layer or a coating layer.

In accordance with one aspect of the present disclosure, provided is a method of manufacturing a liquid metal-based electrode, the method including preparing a metal nanoparticle solution; adding metal micron particles and a surface modifier to the metal nanoparticle solution to prepare a mixed solution; adding a liquid metal to the mixed solution to prepare a composite ink containing the liquid metal having a surface oxide film formed thereon; forming an electrode by applying the composite ink onto a substrate; and irradiating the electrode with light to destroy the surface oxide film.

According to one embodiment, in the forming, the applying may be performed by printing the composite ink on the substrate to form a pattern layer.

According to one embodiment, in the forming, the applying may be performed by coating an entire area of the substrate with the composite ink to form a coating layer.

According to one embodiment, the metal nanoparticles may include any one selected from gold, silver, copper, nickel, tin, and an alloy composition thereof.

According to one embodiment, the metal nanoparticles may have a diameter of 10 nm to 200 nm.

According to one embodiment, the metal micron particles may include a mixed composition of any two or more selected from the group consisting of silver (Ag), copper (Cu), nickel (Ni), and aluminum (Al).

According to one embodiment, the surface modifier may be an organic molecule having any one or more selected from the group consisting of a carboxyl group, an amine group, an imine group, a thiol group, a hydroxyl group, and a carbonyl group or a polymer having any one or more selected from the group consisting of a carboxyl group, an amine group, an imine group, a thiol group, a hydroxyl group, and a carbonyl group.

According to one embodiment, a weight ratio of the nanoparticles and the metal micron particles:the liquid metal may be 1:9 to 8:2, and a weight ratio of the metal nanoparticles:the metal micron particles may be 2:8 to 8:2.

According to one embodiment, the liquid metal may be an alloy composition of any two or more selected from the group consisting of gallium (Ga), indium (In), and tin (Sn).

According to one embodiment, in the irradiating, the metal nanoparticles may absorb light energy and form cracks in the surface oxide film through temperature change to destroy the surface oxide film.

According to one embodiment, a scan rate of the laser beam may be 200 mm/sec to 1,000 mm/sec.

According to one embodiment, the metal micron particles may improve an initial conductivity of the electrode, and the improved initial conductivity may be 500 S/cm to 10,000 S/cm.

BRIEF DESCRIPTION OF THE DRAWINGS

The above and other objects, features and other advantages of the present disclosure will be more clearly understood from the following detailed description taken in conjunction with the accompanying drawings, in which:

FIG. 1 is a scanning electron microscope (SEM) image of Preparation Example 1;

FIG. 2 is a graph showing the results of a bending test of Example 1;

FIG. 3 is a graph showing the results of a bending test of Example 2; and

FIG. 4 is a graph showing the results of a bending test of Comparative Example 2.

DETAILED DESCRIPTION OF THE DISCLOSURE

The present disclosure will now be described more fully with reference to the accompanying drawings and contents disclosed in the drawings. However, the present disclosure should not be construed as limited to the exemplary embodiments described herein.

The terms used in the present specification are used to explain a specific exemplary embodiment and not to limit the present inventive concept. Thus, the expression of singularity in the present specification includes the expression of plurality unless clearly specified otherwise in context. It will be further understood that the terms "comprise" and/or "comprising", when used in this specification, specify the presence of stated components, steps, operations, and/or elements, but do not preclude the presence or addition of one or more other components, steps, operations, and/or elements thereof.

It should not be understood that arbitrary aspects or designs disclosed in "embodiments", "examples", "aspects", etc. used in the specification are more satisfactory or advantageous than other aspects or designs.

In addition, the expression "or" means "inclusive or" rather than "exclusive or". That is, unless mentioned otherwise or clearly inferred from context, the expression "x uses a or b" means any one of natural inclusive permutations.

In addition, as used in the description of the disclosure and the appended claims, the singular form "a" or "an" is intended to include the plural forms as well, unless context clearly indicates otherwise.

In addition, when an element such as a layer, a film, a region, and a constituent is referred to as being "on" another element, the element can be directly on another element or an intervening element can be present.

In general, since a liquid metal has high surface tension, it is impossible to form a coating or pattern on a substrate with the liquid metal. In the present disclosure, to manufacture an electrode having high conductivity using a liquid metal, a composite ink containing a liquid metal having a surface oxide film formed thereon was used. Metal nanoparticles having a light energy absorption rate were introduced to remove the surface oxide film of the liquid metal, and metal micron particles were added to ensure high conductivity. Coating and printing were performed using the composite ink containing the liquid metal and the metal nanoparticles to form a thin film, and the surface oxide film of the liquid metal was removed through a light irradiation process. The manufactured electrode showed stable resistance change characteristics under bending conditions while having high conductivity.

In the present disclosure, an electrode manufactured by forming a pattern layer or coating layer on a substrate using the composite ink containing the liquid metal is referred to as a "liquid metal-based electrode".

A method of manufacturing a liquid metal-based electrode according to one embodiment of the present disclosure includes a step of preparing a metal nanoparticle solution, a step of adding metal micron particles and a surface modifier to the metal nanoparticle solution to prepare a mixed solution, a step of adding a liquid metal to the mixed solution to prepare a composite ink containing the liquid metal having a surface oxide film formed thereon, a step of forming an electrode by applying the composite ink onto a substrate, and a step of irradiating the electrode with light to destroy the surface oxide film.

According to one embodiment, in the step of forming an electrode, the applying may be performed by printing the composite ink on the substrate to form a pattern layer. In this case, the composite ink may be printed according to a specific pattern through inkjet printing, gravure printing, reverse offset printing, or dispensing printing, and a metal pattern layer may be formed on a portion of a substrate to manufacture an electrode.

According to one embodiment, in the step of forming an electrode, the applying may be performed by coating the entire area of the substrate with the composite ink to form a coating layer. In this case, the entire area of the substrate may be coated with the composite ink through bar coating, spin coating, spray coating, or slot die coating to manufacture an electrode.

By adding the liquid metal to the mixed solution, an interface is formed between the liquid metal and the metal nanoparticles, and an oxide film is formed at the interface to reduce the surface tension of the composite ink. After the printing process (formation of a pattern layer) and the coating process (formation of an entire-area coating layer), through light absorption, heat generation, and heat transfer by the metal nanoparticles, the surface oxide film formed on the interface may be removed, and a flexible/stretchable electrode in which the liquid metal, the metal nanoparticles, and the metal micron particles are interconnected may be manufactured.

More specifically, to form an interface between the liquid metal and the metal nanoparticles, a mixed solution is prepared by adding a surface modifier capable of physical bonding with the liquid metal and the metal nanoparticles.

Thereafter, the oxide film is subjected to rapid heat treatment at a high temperature through light irradiation, and then the temperature is rapidly reduced. At this time, the shell layer of the oxide film is damaged due to thermal shock, that is, a rapid temperature change applied for a short time, and cracks occur. When cracks are formed, the surface oxide film is broken and the liquid metal inside flows out. At this time, some form a solid phase, and the metal micron particles form a partial network structure, thereby maintaining the shape of the composite ink. The composition of the solid phase is an alloy phase between elements of the liquid metal, elements of the metal nanoparticles, and elements of the metal micron particles.

The rapid decrease in temperature is due to instantaneous light irradiation, which is a decrease in temperature due to natural cooling. Referring to the experimental results described later, cooling is completed within a few seconds.

When light irradiation is performed, a laser or white light lamp capable of rapid high-temperature heat treatment is preferably used as a light source. In the case of removing the oxide film using an acid, there is a problem that chemical damage to other functional layers inevitably occurs in the pattern layer or coating layer formed to be used as a circuit electrode.

According to one embodiment, the metal nanoparticles may include any one selected from gold, silver, copper, nickel, tin, and an alloy composition thereof.

According to one embodiment, the metal nanoparticles may have a diameter of 10 nm to 200 nm, preferably 20 nm to 150 nm.

When the diameter of the metal nanoparticles is within the range, upon light irradiation, the metal nanoparticles may absorb photons maximally. When the diameter of the metal nanoparticles exceeds the range, the light absorption rate of the metal nanoparticles may decrease. When the diameter of the metal nanoparticles is less than the range, as the specific surface area of the metal nanoparticles increases, an oxide film may be formed on the surface of the metal nanoparticles, which reduces heat generation and heat transfer effects.

According to one embodiment, the metal micron particles may include a mixed composition of any two or more selected from the group consisting of silver (Ag), copper (Cu), nickel (Ni), and aluminum (Al).

Preferably, disc-shaped metal micron particles may be used rather than spherical metal micron particles. In the case of the spherical micron particles, an inter-particle contact is a point, but in the case of the disc-shaped micron particles, an inter-particle contact is a plane. Accordingly, the disc-shaped micron particles have an advantage in forming a conductivity network by connecting particles. Metal flakes may be used as the disc-shaped metal micron particles.

Solid metals have higher electrical conductivity than liquid metals. However, when the metal nanoparticles are added, the electrical conductivity of the ink decreases because a large number of interfaces are formed. In this case, the decrease in electrical conductivity may be minimized by additionally adding metal particles having a micron size that may reduce the interfacial resistance.

In the composite ink of the present disclosure, the main roles of the metal nanoparticles are light absorption, heat generation, and heat transfer, and the main role of metal micron particles is to maximize electrical conductivity.

According to one embodiment, the surface modifier may be an organic molecule having any one or more selected from the group consisting of a carboxyl group, an amine group, an imine group, a thiol group, a hydroxyl group, and a carbonyl group or a polymer having any one or more selected from the group consisting of a carboxyl group, an amine group, an imine group, a thiol group, a hydroxyl group, and a carbonyl group.

More specifically, the surface modifier may be any one organic molecule selected from citric acid (CA), aminobenzoic acid, aminocyclohexanecarboxylic acid, aminobutyric acid, ethyl ene-di amine-tetraacetic acid, 4-mercaptobenzoic acid, benzene-1,4-dithiol, ethylenediamine, diethylenetriamine, and acetylacetone, without being limited thereto.

In addition, the surface modifier may be any one polymer selected from polyethyleneimine, polyallylamine, polyacrylic acid, polypropylene glycol, polyethylene glycol, poly(ethylene glycol)methyl ether thiol, ethylacetoacetate, and polyvinylpyrrolidone (PVP), without being limited thereto.

A composite ink in which the metal nanoparticles, the metal micron particles, and the liquid metal are homogeneously mixed may be prepared by using the surface modifier.

Without use of the surface modifier, the liquid metal does not mix with the metal nanoparticles, so the high surface tension properties of the liquid metal are not resolved. Accordingly, by forming a plurality of interfaces through homogeneous mixing, an oxide film is formed on the surface of liquid metal, and a shape in which the metal nanoparticles are physically bonded to the interfaces is induced.

According to one embodiment, the weight ratio of the metal nanoparticles and the metal micron particles:the liquid metal may be 1:9 to 8:2, and the weight ratio of the metal nanoparticles:the metal micron particles may be 2:8 to 8:2.

Here, the metal nanoparticles and the metal micron particles mean a sum of the weights of the metal nanoparticles and the metal micron particles.

In the weight ratio of the metal nanoparticles and the metal micron particles:the liquid metal, when the weight of the liquid metal exceeds the range, after light irradiation, due to an excess of a liquid phase, the shape may not be maintained. When the weight of the liquid metal is less than the range, stable electrical characteristics may not be expressed due to an increase in the resistance change rate of an electrode.

In the weight ratio of the metal nanoparticles:the metal micron particles, when the weight of the metal nanoparticles exceeds the range, after light irradiation, the electrical conductivity of an electrode may be reduced because the electrode cracks due to excessive shrinkage. When the weight of the metal nanoparticles is less than the range, the electrical conductivity of an electrode may be reduced because the metal nanoparticles do not absorb enough light to destroy the oxide film of the liquid metal.

According to one embodiment, the liquid metal may be an alloy composition of any two or more selected from the group consisting of gallium (Ga), indium (In), and tin (Sn).

According to one embodiment, in the step of irradiating the pattern layer or the entire area coating layer with light to destroy the surface oxide film, the metal nanoparticles may destroy the surface oxide film by absorbing light energy and forming cracks in the surface oxide film through rapid temperature change.

The heat treatment process for removing the oxide film present on the surface of the liquid metal includes high-temperature heat treatment that cannot be applied to electronic circuit substrates. When instantaneously heating the oxide film to a high temperature, and then rapidly cooling the oxide film, cracks occur due to thermal shock. At this time, heat damage to a substrate may be prevented because the generated heat is not transferred to the substrate. In general, when light such as a laser beam is radiated, a part of light energy is converted into thermal energy. In the present disclosure, by conducting rapid high-temperature heat treatment through laser beam irradiation, cracks are formed in the shell layer of the oxide film, and the cracks cause the shell layer of the oxide film to break and the liquid metal inside flows out. At this time, a partial solid alloy phase is formed, and the metal micron particles form a partial network so that the shape of the pattern layer or coating layer may be maintained, and high conductivity and flexible/stretchable characteristics may be secured.

When the metal nanoparticles are subjected to light treatment, light energy is converted into thermal energy, and the same effect as heat treatment may be obtained. However, to obtain the same effect, heat treatment should be performed for 30 minutes or more, but light irradiation may be performed only for a short time. Under a general atmospheric condition (oxygen: 21 v/v %, pressure: 1 atm), when heat is applied instead of light for 0.5 msec to 800 msec, thermal energy sufficient to destroy the oxide film is not absorbed. During heat treatment, since thermal energy is applied for a relatively long time, the metal particles are oxidized and the desired characteristics of a metal material, such as electrical conductivity, are lost. To prevent this problem, the heat treatment process is performed under an inert gas condition. However, during light irradiation, since the metal nanoparticles are irradiated with light only for a short time of 0.5 msec to 800 msec, the metal nanoparticles are not oxidized even when the light irradiation process is performed under a general atmospheric condition. Preferably, the light firing process is performed for 1 msec to 300 msec.

When light irradiation time is less than the above range, cracks are not generated in the oxide film due to lack of light energy, so the oxide film is not broken and electrical conductivity may not be obtained. When light irradiation time exceeds the above range, the metal nanoparticles and the metal micron particles in the composite ink may be oxidized and electrical conductivity may be lost.

According to one embodiment, the scan rate of the laser beam may be 200 mm/sec to 1,000 mm/sec. When the scan rate of the laser beam is less than the range, excessive light irradiation and heat generation may cause side reactions to reduce electrical conductivity. When the scan rate of the laser beam exceeds the range, due to insufficient light irradiation and heat generation, the electrical conductivity of the electrode may be reduced and the resistance change rate may be increased.

Without the metal nanoparticles, the composite ink may not absorb enough light energy to crack the oxide film. In addition, a composite ink without the metal micron particles has a limitation in that the composite ink does not show sufficient electrical conductivity.

A pattern layer is formed by printing the composite ink containing the metal nanoparticles, the metal micron particles, and the liquid metal on a substrate, and then light irradiation is performed to destroy an oxide film on the surface of the liquid metal. Alternatively, an entire area coating layer is formed by applying the composite ink onto the entire area of a substrate, and then light irradiation is performed to destroy an oxide film on the surface of the liquid metal.

The metal nanoparticles have a very high absorption rate for photons of a specific wavelength. The metal nanoparticles absorb light energy during the light irradiation process and convert the light energy into thermal energy. The converted thermal energy serves to remove the oxide film on the surface of the liquid metal. The oxide film is removed and the liquid metal flows out. As a result, the light irradiated metal pattern layer or coating layer exhibits excellent electrical conductivity due to the metal micron particles, and flexible and stretchable characteristics may be secured due to the liquid metal.

In addition, the metal nanoparticles existing between the metal micron particles and the liquid metal may improve electrical conductivity by improving connectivity between metal materials through light sintering reaction.

According to one embodiment, the metal micron particles may improve the initial conductivity of the electrode. In this case, the improved initial electrical conductivity may be 500 S/cm to 10,000 S/cm.

Hereinafter, the present disclosure will be described in more detail through examples. These examples are intended to explain the present disclosure in more detail, and the scope of the present disclosure is not limited by these examples.

[Preparation Example 1] Copper Nanoparticle Solution 12 g of polyvinylpyrrolidone (molecular weight: 58,000) was added to 280 mL of diethyleneglycol, followed by stirring at 90° C. for 30 minutes to dissolve polyvinylpyrrolidone. The obtained solution was cooled to room temperature, 2.35 g of sodium phosphinate monohydrate ($NaH_2PO_2 \cdot H_2O$) was added thereto, and then the solution was heated to 130° C. while stirring. Then, 7 g of $CuSO_4$ was added to the solution, followed by stirring at 130° C. for 1 hour. Then, the solution was cooled to room temperature. Then, centrifugation was performed at 7,000 rpm for 15 minutes to obtain a precipitate. The precipitate was copper nanoparticles having an average particle size of 90 nm.

A copper nanoparticle solution was prepared by dispersing the formed copper nanoparticles in ethanol (EtOH) at a concentration of 15 wt %.

[Example 1] Electrode (Cu Nanoparticles:Cu Flakes:EGaIn Liquid Metal=1:4:1.25)

2.635 g of a copper nanoparticle solution and 1.60 g of copper flakes were placed in a 20 ml plastic vial and dispersed using internal ultrasonic waves. 2.5 g of a solution prepared by dissolving 10% by weight of polyvinylpyrrolidone (molecular weight: 360,000) in ethanol was added to the copper nanoparticle solution containing copper flakes and dispersed. Then, 0.5 g of eutectic gallium and indium (EGaIn) and 1.556 g of ethylene glycol (EG) were added thereto and mixed uniformly using a THINKY mixer to obtain a composite ink consisting of the Cu nanoparticles, the Cu flakes, and the EGaIn liquid metal. The weight ratio of the Cu nanoparticles, the Cu flakes, and the EGaIn liquid metal constituting the composite ink was 1:4:1.25.

A polyimide (PI) substrate having a thickness of 75 μm was coated with the composite ink through a bar-coating process to form a coating layer having a thickness of 26 μm, and then the substrate was dried at 80° C.

The substrate was irradiated with a laser beam having a wavelength of 532 nm at a power of 1.7 W and scan rates of 400 mm/sec, 500 mm/sec, and 700 mm/sec. By radiating a laser beam at scan rates of 400, 500, and 700 mm/sec, light firing of a sample having a length of 100 mm was performed for short periods of 250, 200, and 140 msec.

[Example 2] Electrode (Cu Nanoparticles:Cu Flakes:EGaIn Liquid Metal=1:4:3.3)

1.976 g of a copper nanoparticle solution and 1.20 g of copper flakes were placed in a 20 ml plastic vial and dispersed using internal ultrasonic waves. 2.5 g of a solution prepared by dissolving 10% by weight of polyvinylpyrrolidone (molecular weight: 360,000) in ethanol was added to the copper nanoparticle solution containing copper flakes and dispersed. Then, 1 g of eutectic gallium and indium (EGaIn) and 1.46 g of ethylene glycol (EG) were added thereto and mixed uniformly using a THINKY mixer to obtain a composite ink consisting of the Cu nanoparticles, the Cu flakes, and the EGaIn liquid metal. The weight ratio of the Cu nanoparticles, the Cu flakes, and the EGaIn liquid metal constituting the composite ink was 1:4:3.3.

A polyimide (PI) substrate having a thickness of 75 μm was coated with the composite ink through a bar-coating process to form a coating layer having a thickness of 26 μm, and then the substrate was dried at 80° C.

The substrate was irradiated with a laser beam having a wavelength of 532 nm at a power of 1.7 W and scan rates of 400 mm/sec, 500 mm/sec, and 700 mm/sec. By radiating a laser beam at scan rates of 400, 500, and 700 mm/sec, light firing of a sample having a length of 100 mm was performed for short periods of 250, 200, and 140 msec.

[Comparative Example 1] Electrode (Cu Nanoparticles:Cu Flakes:EGaIn Liquid Metal=0:1:3)

0.62 g of copper flakes and ethanol (EtOH) were placed in a 20 ml plastic vial and dispersed using internal ultrasonic waves. 2.5 g of a solution prepared by dissolving 10% by weight of polyvinylpyrrolidone (molecular weight: 360,000) in ethanol was added to the solution containing the copper flakes and dispersed. Then, 1.87 g of eutectic gallium and indium (EGaIn) and 2.7 g of ethanol (EtOH) were added thereto and mixed uniformly using a THINKY mixer to obtain an ink consisting of the Cu flakes and the EGaIn liquid metal. The weight ratio of the Cu flakes and the EGaIn liquid metal constituting the ink of Comparative Example 1 was 1:3.

A polyimide (PI) substrate having a thickness of 75 μm was coated with the composite ink through a bar-coating process to form a coating layer having a thickness of 26 μm, and then the substrate was dried at 80° C.

The substrate was irradiated with a laser beam having a wavelength of 532 nm at a power of 1.7 W and scan rates of 400 mm/sec, 500 mm/sec, and 600 mm/sec. By radiating a laser beam at scan rates of 400, 500, and 600 mm/sec, light firing of a sample having a length of 100 mm was performed for short periods of 250, 200, and 160 msec. The scan rate was set through the optimization process of each process.

[Comparative Example 2] Electrode (Cu Nanoparticles:Cu Flakes:EGaIn Liquid Metal=1:0:4)

3.3 g of a copper nanoparticle solution and 2.5 g of a solution prepared by dissolving 10% by weight of polyvinylpyrrolidone (molecular weight: 360,000) in ethanol were added to a 20 ml plastic vial and dispersed. Then, 2 g of eutectic gallium and indium (EGaIn) and 2.9 g of ethanol (EtOH) were added thereto and mixed uniformly using a THINKY mixer to obtain an ink consisting of the Cu nanoparticles and the EGaIn(Ga—In) liquid metal. The weight ratio of the Cu nanoparticles and the EGaIn liquid metal constituting the ink of Comparative Example 2 was 1:4.

A polyimide (PI) substrate having a thickness of 75 μm was coated with the composite ink through a bar-coating process to form a coating layer having a thickness of 26 μm, and the substrate was dried at 80° C.

The substrate was irradiated with a laser beam having a wavelength of 532 nm at a power of 1.7 W and scan rates of 400 mm/sec, 500 mm/sec, and 600 mm/sec. By radiating a laser beam at scan rates of 400, 500, and 600 mm/sec, light firing of a sample having a length of 100 mm was performed for short periods of 250, 200, and 160 msec.

[Comparative Example 3] Electrode (Cu Nanoparticles:Cu Flakes:EGaIn Liquid Metal=1:3:0)

4.2 g of a copper nanoparticle solution and 1.87 g of copper flakes were placed in a 20 ml plastic vial and dispersed using internal ultrasonic waves. Then, 2.5 g of a solution prepared by dissolving 10% by weight of polyvinylpyrrolidone (molecular weight: 360,000) in ethanol was added to the copper nanoparticle solution containing copper flakes and mixed uniformly using a THINKY mixer to obtain an ink consisting of the Cu nanoparticles and the Cu flakes. The weight ratio of the Cu nanoparticles and the Cu flakes constituting the ink of Comparative Example 3 was 1:3.

A polyimide (PI) substrate having a thickness of 75 μm was coated with the composite ink through a bar-coating process to form a coating layer having a thickness of 26 μm, and then the substrate was dried at 80° C.

The substrate was irradiated with a laser beam having a wavelength of 532 nm at a power of 1.7 W and scan rates of 400 mm/sec, 500 mm/sec, and 600 mm/sec. By radiating a laser beam at scan rates of 400, 500, and 600 mm/sec, light firing of a sample having a length of 100 mm was performed for short periods of 250, 200, and 160 msec.

FIG. 1 is a scanning electron microscope (SEM) image of Preparation Example 1. Referring to FIG. 1, it can be confirmed that the diameter of the copper nanoparticles synthesized in Preparation Example 1 is about 90 nm.

[Experimental Example 1] Bending Test

During the bending test, deformation resistance when a bending moment was applied was measured.

The entire area of a polyimide (PI) film was coated with an ink through a bar-coating process to form a liquid metal-based composite, and the composite was dried in an oven. After drying, the composite was cut into a size of 40 mm (width)×20 mm (length) and a laser process was performed. After the laser process, the composite was cut into a size of 40 mm (width)×2 mm (length), and a sample for bending test was prepared by connecting wires between the composites with silver epoxy at 10 mm intervals along the horizontal length. Then, the resistance characteristics of the composites during bending were compared using a SourceMeter and a bending machine.

FIG. 2 shows the results of performing the bending test for 30 cycles using Example 1.

FIG. 3 shows the results of performing the bending test for 30 cycles using Example 2.

FIG. 4 shows the results of performing the bending test for 30 cycles using Comparative Example 2.

When the composite ink is prepared using only the metal nanoparticles and the metal micron particles, the electrode is damaged by tensile stress applied during bending, resulting in loss of conductivity. In the case of the composite ink that additionally contains the liquid metal, electrical conductivity is maintained during bending because the electrode is not damaged by tensile stress applied during bending due to the liquid nature of the liquid metal. That is, an electrode having flexible and tensile properties may be manufactured by using the liquid metal.

The results of the bending test are summarized in the following tables.

TABLE 1

Initial electrical conductivity depending on scan rate

| | 400 mm/sec | 500 mm/sec | 600 mm/sec | 700 mm/sec |
|---|---|---|---|---|
| Example 1 | 5,500 S/cm | 3,600 S/cm | — | 2,600 S/cm |
| Example 2 | 2,329 S/cm | 1,550 S/cm | — | 771 Ω/cm |
| Comparative Example 1 | | No conductivity | | |
| Comparative Example 2 | 1,043 S/cm | 847 S/cm | 755 S/cm | — |
| Comparative Example 3 | 15,000 S/cm | 8,000 S/cm | 4,200 S/cm | — |

Referring to Table 1, in Examples 1 and 2, as the scan rate decreases, the heat treatment effect by a laser beam increases, so the electrical conductivity increases. In addition, as the proportion of the metal micron particles having high conductivity increases (Comparative Example 2<Example 2<Example 1), the electrical conductivity increases.

When no metal nanoparticles are added (Comparative Example 1), there is no conductivity because light energy absorption and heat generation are impossible. When the liquid metal is not added (Comparative Example 3), high conductivity is observed because a metal electrode is composed of only a solid phase. However, referring to Table 2, due to lack of flexibility and elongation characteristics due to the absence of a liquid phase, conductivity is lost during bending.

TABLE 2

R/R$_0$ (resistance change rate) depending on scan rate

|  | 400 mm/sec | 500 mm/sec | 600 mm/sec | 700 mm/sec |
|---|---|---|---|---|
| Example 1 | 1.42 | 1.64 | — | 1.67 |
| Example 2 | 1.25 | 1.32 | — | 1.52 |
| Comparative Example 2 | 1.12 | 1.21 | 1.25 | — |
| Comparative Example 3 | Resistance cannot be measured | | | |

The resistance change rate (R/R$_0$) is a resistance (R) value with respect to initial resistance (R$_0$).

Referring to Table 2, in Examples 1 and 2, as the scan rate decreases, the heat treatment effect by a laser beam increases, so the resistance change rate decreases. In addition, as the ratio of the metal micron particles increases (Comparative Example 2<Example 2<Example 1), the resistance change rate increases.

In the case of the composite ink used in Example 1 (Cu nanoparticles:Cu flakes:EGaIn liquid metal=1:4:1.25), based on the total weight, the ratio of the metal micron particles is 64%, and the ratio of the liquid metal is 20%.

In the case of the composite ink used in Example 2 (Cu nanoparticles:Cu flakes:EGaIn liquid metal=1:4:3.3), based on the total weight, the ratio of the metal micron particles is about 48.2%, and the ratio of the liquid metal is about 40%.

In the case of the composite ink used in Comparative Example 2 (Cu nanoparticles:EGaIn liquid metal=1:4), based on the total weight, the ratio of the metal micron particles is 0%, and the ratio of the liquid metal is 80%.

Referring to Tables 1 and 2, as the ratio of the metal micron particles increases, electrical conductivity increases and resistance change rate also increases. As the ratio of the liquid metal increases, electrical conductivity decreases and resistance change rate also decreases. Accordingly, electrical conductivity and resistance change rate may be controlled by adjusting the ratio of the metal micron particles and the liquid metal in the ink composition.

In the case of an electrode manufactured using the liquid metal-based composite ink according to Examples of the present disclosure, even after 30 times of bending, the resistance change rate (R/R$_0$) is maintained at 1.0 to 1.5 times. Accordingly, the electrode may be used as an flexible electrode or a stretchable electrode.

According to one embodiment of the present disclosure, by introducing metal nanoparticles having a light energy absorption rate, the surface oxide film of a liquid metal can be removed.

According to another embodiment of the present disclosure, a metal pattern layer having high conductivity can be implemented by using a liquid metal and metal micron particles.

According to another embodiment of the present disclosure, a flexible/stretchable electrode can be implemented by forming a liquid metal-based metal pattern layer.

Although the present disclosure has been described through limited examples and figures, the present disclosure is not intended to be limited to the examples. Those skilled in the art will appreciate that various modifications, additions, and substitutions are possible, without departing from the scope and spirit of the disclosure. Therefore, the scope of the present disclosure should not be limited by the embodiments, but should be determined by the following claims and equivalents to the following claims.

What is claimed is:

1. A method of manufacturing a liquid metal-based electrode, comprising:
   preparing a metal nanoparticle solution;
   adding metal micron particles and a surface modifier to the metal nanoparticle solution to prepare a mixed solution;
   adding a liquid metal to the mixed solution to prepare a composite ink containing the liquid metal having a surface oxide film formed thereon;
   forming an electrode by applying the composite ink onto a substrate; and
   irradiating the electrode with light to destroy the surface oxide film.

2. The method according to claim 1, wherein, in the forming, the applying is performed by printing the composite ink on the substrate to form a pattern layer.

3. The method according to claim 1, wherein, in the forming, the applying is performed by coating an entire area of the substrate with the composite ink to form a coating layer.

4. The method according to claim 1, wherein the metal nanoparticles comprise any one selected from gold, silver, copper, nickel, tin, and an alloy composition thereof.

5. The method according to claim 1, wherein the metal nanoparticles have a diameter of 10 nm to 200 nm.

6. The method according to claim 1, wherein the metal micron particles comprise a mixed composition of any two or more selected from the group consisting of silver (Ag), copper (Cu), nickel (Ni), and aluminum (Al).

7. The method according to claim 1, wherein the surface modifier is an organic molecule having any one or more selected from the group consisting of a carboxyl group, an amine group, an imine group, a thiol group, a hydroxyl group, and a carbonyl group or a polymer having any one or more selected from the group consisting of a carboxyl group, an amine group, an imine group, a thiol group, a hydroxyl group, and a carbonyl group.

8. The method according to claim 1, wherein a weight ratio of the nanoparticles and the metal micron particles:the liquid metal is 1:9 to 8:2, and a weight ratio of the metal nanoparticles:the metal micron particles is 2:8 to 8:2.

9. The method according to claim 1, wherein the liquid metal is an alloy composition of any two or more selected from the group consisting of gallium (Ga), indium (In), and tin (Sn).

10. The method according to claim 1, wherein, in the irradiating, the metal nanoparticles absorb light energy and form cracks in the surface oxide film through temperature change to destroy the surface oxide film.

11. The method according to claim 1, wherein the light irradiation is performed using a laser beam, and a scan rate of the laser beam is 200 mm/sec to 1,000 mm/sec.

12. The method according to claim 1, wherein the metal micron particles improve an initial conductivity of the electrode, and the improved initial conductivity is 500 S/cm to 10,000 S/cm.

* * * * *